United States Patent [19]

Taniguchi et al.

[11] Patent Number: 5,377,063
[45] Date of Patent: Dec. 27, 1994

[54] FLOATING HEAD SLIDER AND MAGNETIC HEAD FOR MAGNETIC RECORDING AND REPRODUCING

[75] Inventors: Yoshinobu Taniguchi; Hideki Yoshikawa; Isao Yasuda, all of Osaka, Japan

[73] Assignee: Sanyo Electric Co., Ltd., Osaka, Japan

[21] Appl. No.: 94,262

[22] Filed: Jul. 21, 1993

[30] Foreign Application Priority Data

Jul. 23, 1992 [JP] Japan .................. 4-197130

[51] Int. Cl.$^5$ .................................................. G11B 5/60
[52] U.S. Cl. ................................................. 360/103
[58] Field of Search ........................................ 360/103

[56] References Cited

U.S. PATENT DOCUMENTS 5,128,822  7/1992  Chapin ................... 360/103

FOREIGN PATENT DOCUMENTS 2-230575  9/1990  Japan .

Primary Examiner—A. J. Heinz
Attorney, Agent, or Firm—Nikaido, Marmelstein, Murray & Oram

[57] ABSTRACT

A floating head slider comprising two side rails formed on a surface thereof to be opposed to a recording medium and arranged approximately in parallel to the direction of movement of the slider relative to the recording medium, and a cross rail formed on the surface and disposed between the two side rails. The cross rail is divided into a first portion and a second portion by an opening groove, which is defined by opposite side walls so inclined that an air outlet of the opening groove is smaller than an air inlet thereof.

4 Claims, 2 Drawing Sheets

FLOATING HEAD SLIDER AND MAGNETIC HEAD FOR MAGNETIC RECORDING AND REPRODUCING

FIELD OF THE INVENTION

The present invention relates to a floating head slider for use in magnetic disc devices of high recording density, such as HDD (hard disc drive device).

BACKGROUND OF THE INVENTION

In recent years, HDDs and like magnetic disc devices are made available in smaller sizes with greater capacities, and with this trend, it is required to provide magnetic heads which are adapted for high-density recording at a low relative velocity. Accordingly, sliders for use in magnetic heads of the floating type must be so constructed that the magnetic head can be levitated with stability even at a low relative velocity at which the air film has low rigidity.

FIG. 2 is a perspective view showing a conventional floating head slider utilizing negative pressure. This conventional slider is formed, on the surface thereof to be opposed to magnetic discs, with two side rails 11, 12 extending approximately in parallel to the direction of travel of the magnetic disc, and with a cross rail 20 positioned on the air inflow side (disc advancing side) of the slider, having a longitudinal axis generally orthogonal to the side rails 11, 12 and interconnecting the side rails 11, 12. The slider further has a tapered portion 30 at the air inflow side, and thin film head elements 41, 42 at the air outflow side. The surfaces of the side rails 11, 12 and the surface of the cross rail 20 form the same plane to serve as a surface for producing a positive pressure, i.e., a levitative force, when the slider moves relative to the magnetic disc. The region having three sides surrounded by the two rails 11, 12 and the cross rail 20 is in the form of a recessed face 50, which acts as a surface for producing a negative pressure, i.e., suction acting toward the magnetic disc, when the slider moves relative to the disc.

As shown in FIG. 3, this negative pressure F is produced by an air stream 3 flowing into a space between the slider 1 and the magnetic disc 2, when the stream as compressed between the cross rail 20 and the disc 2 thereafter expands between the recessed face 50 and the disc 2 to form an expanded flow. The negative pressure acts in balance with the positive pressure afforded by the rigidity of air to the rails 11, 12, giving a stabilized amount of levitation to the slider even at a low relative velocity.

With the conventional floating head slider, however, the cross rail 20 is present at the air inflow side to prevent the air stream from escaping, so that the slider has the problem that the dust present on the magnetic disc or in the air ingresses into the space between the slider and the disc, causing damage to the slider or the disc or impeding stable levitation. Further since the air stream from the front of the slider is prevented from escaping, the slider front side is liable to be influenced by the pressure of air. This entails the problem of producing variations in the pitch angle, i.e., the angle of inclination of the slider with respect to the disc surface in the longitudinal direction of the slider.

For example, Examined Japanese Patent Publication HEI 2-230575 discloses a floating head slider which has overcome the above problems. This slider has a cross rail disposed approximately at the central portion only so as to be separate from two side rails.

The disclosed slider nevertheless has another problem. To be fully effective, the cross rail needs to have a small length, which then prevents occurrence of negative pressure, rendering the slider no longer floatable at a low position.

The slider has another problem in that a lateral blast of air acts on the slider owing to an inclination thereof with respect to the direction of its movement relative to the magnetic disc, rendering unstable the angle of inclination in the lateral direction with respect to the disc surface, namely, the roll angle. Moreover, the angle of inclination of the slider with respect to the direction of its movement relative to the disc, i.e., the skew angle, differs depending on whether the slider is positioned at the inner periphery of the magnetic disc or at the outer periphery thereof to alter the magnitude of the lateral stream of air, hence the problem that the levitated state of the slider at the disc inner periphery differs from that of the slider at the disc outer periphery.

SUMMARY OF THE INVENTION

An object of the present invention, which has been accomplished in view of the drawbacks of the conventional sliders described above, is to provide a floating head slider which is made free of the adverse effect of dust without diminishing the negative pressure and which is prevented from floating in an unstable state owing to air streams from the front of the slider and from the lateral sides thereof.

The present invention provides a floating head slider which is characterized in that the cross rail is divided into a first portion and a second portion by an opening groove, the opening groove being defined by opposite side walls so inclined that an air outlet of the opening groove is smaller than an air inlet thereof.

The floating head slider of the present invention is further characterized in that with respect to the forward direction of the slider, the opposite side walls have an angle of inclination $\theta$ which is not smaller than the skew angle.

With the construction described above, dust and the air stream from the front of the slider flow predominantly into the opening groove through the air inlet. The air stream flowing into the opening groove is constricted by the inclination of the side walls and flows out of the air outlet, whereupon the stream abruptly expands to produce a negative pressure. Furthermore, the air streams from the lateral sides of the slider are also led into the opening groove by the inclination of the side walls defining the groove.

Further when the angle of inclination $\theta$ of the groove-defining side walls is not smaller than the skew angle, the air streams from the lateral sides of the slider are allowed to escape into the opening groove satisfactorily.

DETAILED DESCRIPTION OF EMBODIMENT

An embodiment of the present invention will be described below in detail with reference to the drawings.

Figure 1:
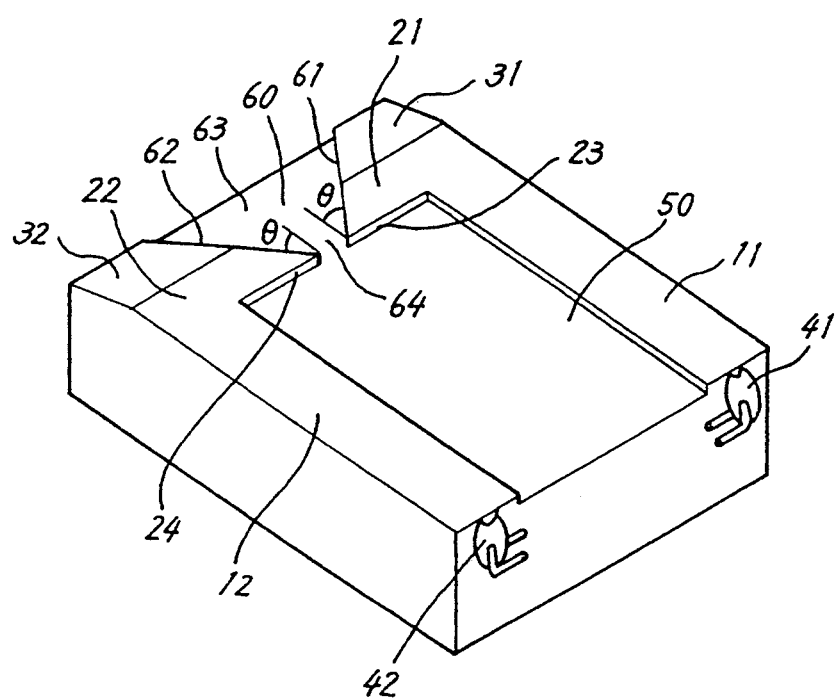
FIG. 1 is a perspective view of a floating head slider of the invention.
Figure 2:
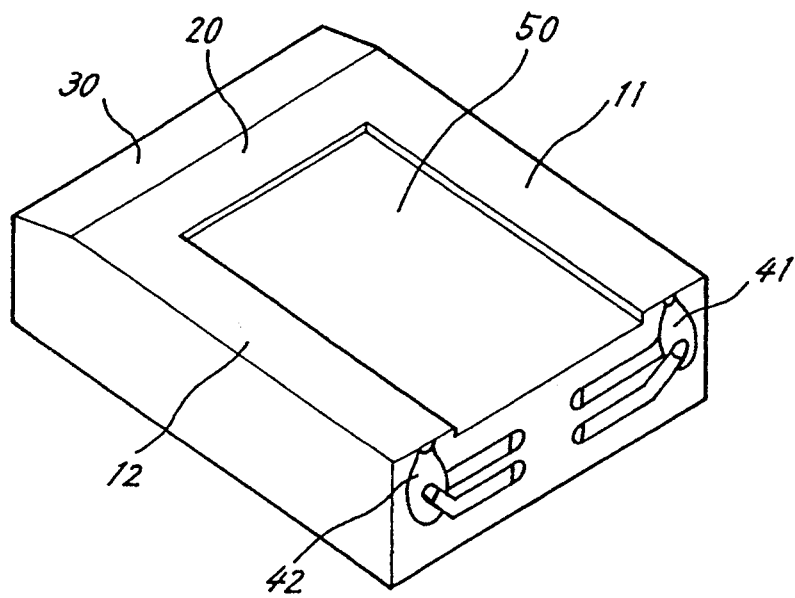
FIG. 2 is a perspective view of a conventional floating head slider.
Figure 3:
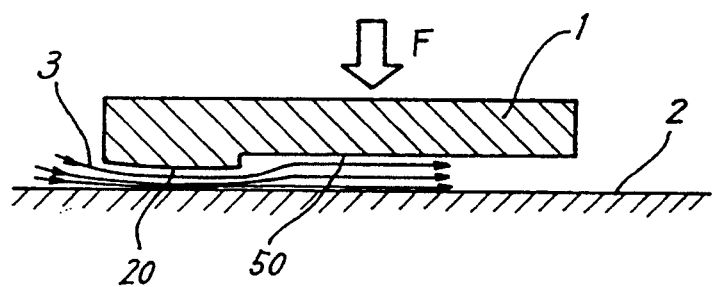
FIG. 3 is a diagram showing the principle on which a negative pressure is produced in the floating head slider.

FIG. 1 is a perspective view of a floating head slider according to the embodiment. Throughout FIGS. 1 and 2, like parts are designated by like reference numerals and will not be described repeatedly.

With the floating head slider of the present embodiment, the cross rail positioned at the air inlet side between the side rails 11, 12 is divided into a first portion 21 and a second portion 22 by an opening groove 60. Accordingly, the tapered portion is also divided into a first part 31 and a second part 32. The opening groove 60 is defined by opposite side walls 61, 62 which are inclined at a predetermined angle with respect to the direction of movement of the slider relative to magnetic discs so as to provide a large air inlet 63 at the front end (disc advancing side) of the opening groove 60 and a small air outlet 64 at the rear end (disc exit side) of the groove. The bottom surface of the groove 60 is flush with the bottom face of the recessed portion 50.

The surface of the floating head slider to be opposed to the magnetic disc and provided by the side rails, cross rail, recessed face, opening groove, etc. is shaped by wet etching with an acid or the like, or dry etching with an ion beam or the like, or laser machining.

With the floating head slider of the present embodiment, the air inlet 63 is large, permitting the dust present on the magnetic disc or in the air to pass through the opening groove 60 to obviate the adverse effect of the dust and further precluding unstable leviation due to the pressure of air acting on the front side of the slider. Furthermore, the air outlet 64 is small, so that the first portion 21 and the second portion 22 of the cross rail have large rear end faces 23, 24 where a negative pressure occurs, while an air stream flows into the opening groove 60, is then constricted by the inclination of the wide walls 61, 62 and abruptly expands upon flowing out over the recessed face 50. Even when the magnetic disc is rotated at a low velocity, therefore, a sufficiently great negative pressure is produced to ensure stabilized levitation. Moreover, the inclination of the side walls 61, 62 defining the opening groove 60 permits air streams from the laterals sides to escape into the opening groove 60, assuring the slider of a stabilized travel relative to the disc. To permit the air streams from the lateral sides of the slider to satisfactorily escape into the opening groove 60, the angle of inclination $\theta$ of the side walls 61, 62 with respect to the forward direction of the slider needs to be not smaller than the angle of inclination of the slider with respect to the direction of movement thereof relative to the magnetic disc, namely, the skew angle. The skew angle is usually within ±15 degrees.

Thus, the floating head slider provided by the present invention is fully made free of the adverse effect of dust on the magnetic disc and in the air, and reduced in instability of levitation due to the pressure of air streams from the front of the slider and lateral sides thereof, assuring the magnetic head of satisfactory recording or reproduction.

The foregoing description of the embodiment is intended to illustrate the present invention and should not be construed as limiting the invention as defined in the appended claims or reducing the scope thereof. The device of the invention is not limited to the above embodiment in construction but can of course be modified variously by one skilled in the art without departing from the spirit of the invention as set forth in the claims.

What is claimed is:

1. A floating head slider comprising two side rails formed on a surface thereof to be opposed to a recording medium and arranged approximately in parallel to the direction of movement of the slider relative to the recording medium, and a cross rail formed on said surface and disposed between the two side rails, the cross rail being divided into a first portion and a second portion by an opening groove, the opening groove being defined by opposite side walls of the first and second portions, said opposite side walls being so inclined with respect to said direction of movement that a distance between the side walls becomes smaller at an air outlet end thereof than at an air inlet end thereof, wherein an air outlet of the opening groove located at a rear-most part of the cross rail is smaller than an air inlet thereof.

2. A floating head slider as defined in claim 1 wherein the opposite side walls defining the opening groove have an angle of inclination $\theta$ of not smaller than a skew angle with respect to the forward direction of the slider.

3. A magnetic head of the floating type comprising a magnetic head device incorporated in a floating head slider, the floating head slider comprising two side rails formed on a surface thereof to be opposed to a recording medium and arranged approximately in parallel to the direction of movement of the slider relative to the recording medium, and a cross rail formed on said surface and disposed between the two side rails, the cross rail being divided into a first portion and a second portion by an opening groove, the opening groove being defined by opposite side walls of the first and second portions, the side walls being so inclined with respect to said direction of movement that a distance between the side walls is smaller at an air outlet end thereof than at an air inlet end thereof, wherein an air outlet of the opening groove located at a rear-most part of the cross rail is smaller than an air inlet thereof.

4. A magnetic head of the floating type as defined in claim 3 wherein the opposite side walls defining the opening groove have an angle of inclination $\theta$ of not smaller than a skew angle.

* * * * *